United States Patent
Iizuka (10) Patent No.: US 6,888,796 B2
(45) Date of Patent: May 3, 2005

(54) COMMUNICATION CONNECTING DEVICE ADAPTIVE TO AN IP NETWORK AND COMMUNICATION RATE CONTROL METHOD THEREFOR

(75) Inventor: Jiro Iizuka, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 788 days.

(21) Appl. No.: 09/876,076

(22) Filed: Jun. 8, 2001

(65) Prior Publication Data

US 2002/0024932 A1 Feb. 28, 2002

(30) Foreign Application Priority Data

Aug. 23, 2000 (JP) ........................................ 2000-258134

(51) Int. Cl.[7] ............................................. H04L 12/26
(52) U.S. Cl. ...................... 370/232; 370/231; 370/233; 370/234
(58) Field of Search ................................ 370/231, 232, 370/233, 234; 374/474

(56) References Cited

U.S. PATENT DOCUMENTS

| | | | |
|---|---|---|---|
| 5,491,565 A | | 2/1996 | Naper |
| 5,572,521 A | * | 11/1996 | Pauwels et al. .............. 370/412 |
| 5,774,455 A | * | 6/1998 | Kawase et al. .............. 370/232 |
| 5,828,744 A | * | 10/1998 | Nemoto .................. 379/215.01 |
| 5,845,142 A | * | 12/1998 | Hayasaka .................... 713/340 |
| 5,872,789 A | * | 2/1999 | Orleth et al. ................ 370/517 |
| 5,877,870 A | * | 3/1999 | Sakai ........................... 358/438 |
| 6,002,668 A | * | 12/1999 | Miyoshi et al. .............. 370/232 |
| 6,330,227 B1 | * | 12/2001 | Miyoshi et al. .............. 370/232 |
| 6,563,599 B1 | * | 5/2003 | Whitfield .................... 358/1.15 |
| 6,721,743 B1 | * | 4/2004 | Sakakibara ................... 707/10 |
| 6,728,263 B2 | * | 4/2004 | Joy et al. ..................... 370/468 |
| 6,735,173 B1 | * | 5/2004 | Lenoski et al. ............. 370/235 |
| 6,757,255 B1 | * | 6/2004 | Aoki et al. .................. 370/252 |

FOREIGN PATENT DOCUMENTS

| | | |
|---|---|---|
| JP | 11-69119 A | 3/1999 |
| WO | WO-99/31873 A1 | 6/1999 |

OTHER PUBLICATIONS

"Procedures for real–time Group 3 facsimile communication over ip–networks," ITU–T Recommendation T.38, Jun. 1998, pp. 1–30.
ITU–T (International Telecommunication Union) Series T: Terminals for Telematic Services, T.38 "Procedures for Real Time Group 3 Facsimile Communication Over IP Networks," Jun. 1998.
ITU–T (International Telecommunication Union) Series T: Telecommunication standardization sector; T.30, 1996.

* cited by examiner

Primary Examiner—Kenneth Vanderpuye
Assistant Examiner—Zewdu Habte
(74) Attorney, Agent, or Firm—Venable LLP; Michael A. Sartori; Daniel G. Vivarelli, Jr.

(57) ABSTRACT

A communication connecting device includes a data storage to which data read by a scanner are written. A packetizer packetizes the data read out of the data storage in accordance with a packet size fed from a size information storage. A rate controller counts a period of time after the start of packet transmission or a period of time consumed to send a preselected number of packets. The rate controller calculates a communication rate on the basis of the above period of time and the number of packets sent, and then compares the communication rate with a communication rate assigned to a receiving terminal and defined by a Recommendation T.30 protocol. The rate controller allows the packets to be sent only if the calculated communication rate is lower than the communication rate of the receiving terminal.

9 Claims, 7 Drawing Sheets

COMMUNICATION CONNECTING DEVICE ADAPTIVE TO AN IP NETWORK AND COMMUNICATION RATE CONTROL METHOD THEREFOR

BACKGROUND OF THE INVENTION

1. Field of the Invention

The present invention relates to a communication connecting device advantageously applicable to a gateway, which connects, e.g., a G3 (Group 3) facsimile apparatus to an IP (Internet Protocol) network, for controlling the transmission rate of packets from a real-time facsimile apparatus or terminal, and a communication rate control method for the same.

2. Description of the Background Art

For facsimile communication using an IP network, a gateway is usually situated between the IP network and an analog facsimile apparatus or communication terminal, e.g., a G3 facsimile apparatus. Serving as an Internet facsimile apparatus, the gateway allows the IP network and G3 facsimile apparatus to surely communicate with each other. A protocol defined by ITU-T (International Telecommunication Union, Telecommunication standardization sector) Recommendation T.30 is assigned to the G3 facsimile apparatus. On the other hand, the Internet facsimile apparatus communicates with a PSTN (Public Switched Telephone Network) in accordance with the above Recommendation T.30 and communicates with the IP network with a protocol defined by ITU-T Recommendation T.38.

Assume that data are sent from one G3 facsimile apparatus (sending apparatus) to another G3 facsimile apparatus (receiving apparatus) via Internet. Then, the sending apparatus first sends a calling tone (CNG) command to the receiving apparatus in accordance with the Recommendation T.30 protocol, requesting the receiving apparatus to return a called station identification (CED) signal. In response, the receiving station sends the CED signal and then sends a digital identification signal (DIS) to the sending apparatus. The DIS signal includes information representative of a communication rate available with the receiving apparatus.

On receiving the DIS signal, the sending apparatus determines a communication rate at which it can communicate with the receiving apparatus. The sending apparatus then sends a digital command signal (DCS) indicative of the determined communication rate to the receiving apparatus. Thereafter, the sending apparatus sends facsimile data to the receiving station.

Assume that the sending apparatus is implemented by a real-time Internet facsimile apparatus. Then, the sending real-time Internet facsimile apparatus also determines a communication rate at which it can communicate with the receiving G3 facsimile apparatus by the above-described procedure. Specifically, the receiving apparatus sends the DIS signal including the communication rate, which is defined by Recommendation T.30, to the sending apparatus. The sending apparatus, however, sends the DSC signal indicative of the communication rate defined by Recommendation T.38 to the receiving apparatus because it is directly connected to the IP network. Specifically, using a traffic capacity of 10 Mbps (megabits per second) or 100 Mbps as a standard, the DCS signal is indicative of a data transmission rate available with 10 BASE, 100 BASE or similar transmission media.

More specifically, a real-time Internet facsimile apparatus is capable of interchanging data even with, e.g., a computer terminal of the type dealing with electronic mails, Internet telephony, video data and so forth. This is why the above-mentioned communication rate is assigned to a real-time Internet facsimile apparatus.

As stated above, the communication rate available with the sending real-time Internet facsimile apparatus is far higher than the communication rate of the receiving G3 facsimile apparatus. Stated another way, the sending apparatus and receiving apparatus cannot negotiate with each other.

SUMMARY OF THE INVENTION

It is an object of the present invention to provide a communication connecting device capable of causing a transmitting terminal, which is connected to an IP network, to conform to the communication rate of an analog receiving terminal, and a communication rate control method for the same.

In accordance with the present invention, a communication connecting device includes the function of a sending communication terminal directly connected to an IP network. The communication connecting device controls the communication rate of data to send to a receiving communication terminal via the IP network. A data storage stores the data to be sent. A packetizer divides the data read out of the data storage into packets having a preselected size each. A size information storage stores information representative of the preselected size for providing the packetizer with the information. A rate control circuit counts a preselected period of time after the start of transmission of the packets or a period of time up to the time when a preselected number of packets are fully sent. The rate control circuit then calculates a communication rate on the basis of the period of time, compares the communication rate with a communication rate determined in accordance with a protocol assigned to the receiving communication terminal, and controls the packetizer in accordance with the result of comparison. An interface is connected to the IP network for sending the packets while adjusting them.

Also, in accordance with the present invention, a communication rate control method for the above-described communication connecting device begins with a step of causing the device to send, at a preparatory stage for data transmission, a first signal to the receiving communication terminal. The device then receives an answer signal output from the receiving communication terminal in response to the first signal and determine a communication rate on the basis of a communication rate, which is included in the answer signal and a communication rate defined by a protocol assigned to the receiving communication terminal. Further, the device sends a second signal including the communication rate determined to the receiving communication terminal. Packet size information is provided for dividing data into packets having a preselected size each. The data are read out and then packetized on the basis of the packet size information. A preselected period of time after a start of transmission of the packets or a period of time up to a time when a preselected number of packets are fully sent is counted. A communication rate of the IP network is calculated on the basis of the above period of time, preselected number of packets and preselected packet size. If the communication rate of the IP network is higher than the communication rate included in the second signal, the transmission of the packets is inhibited. If the former is lower than the latter, a packet send request is generated while control for the transmission of the packets is executed.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Figure 1:
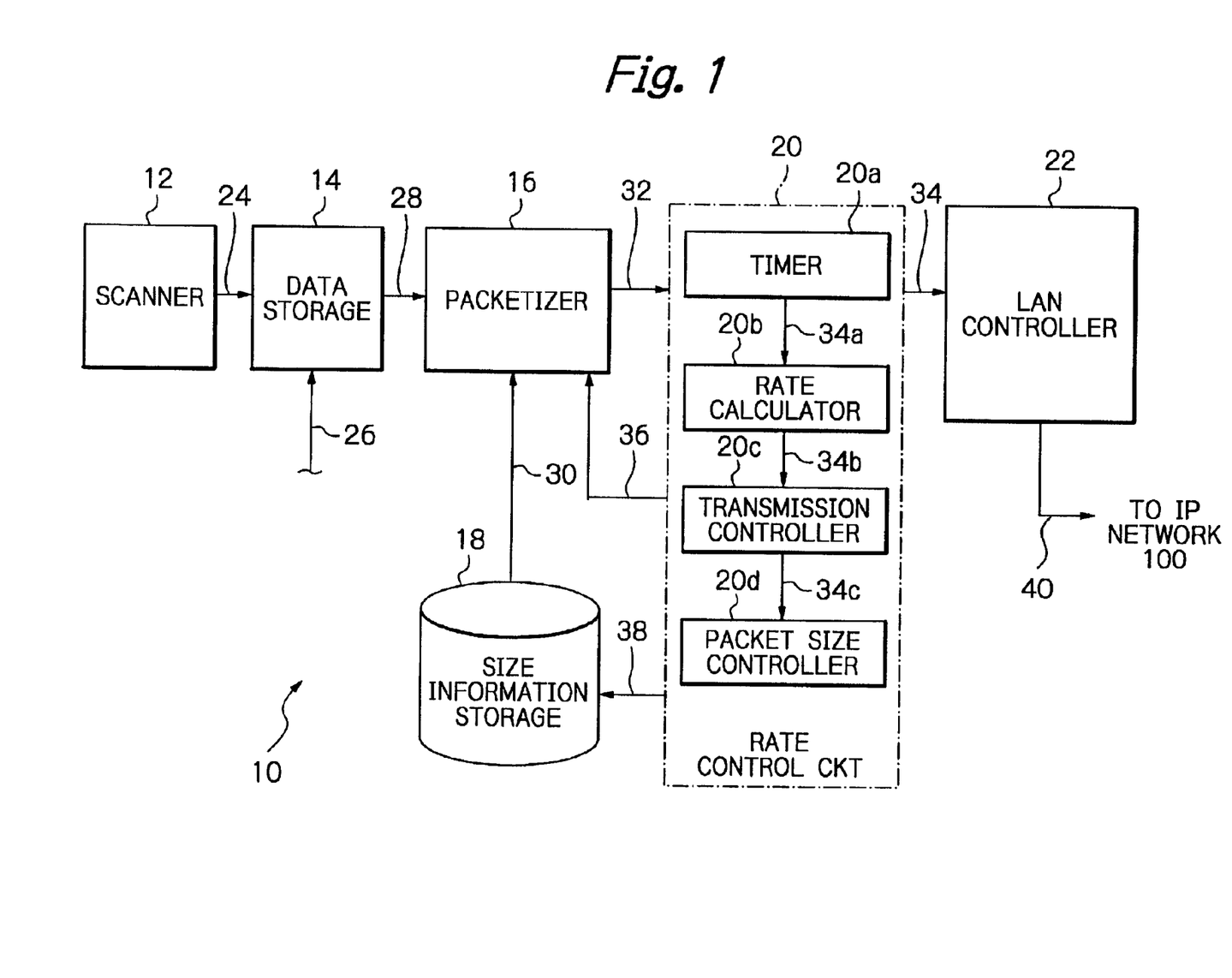
FIG. 1 is a schematic block diagram showing a real-time Internet facsimile apparatus including a preferred embodiment of the communication connecting device in accordance with the present invention.

Referring to FIG. 1 of the drawings, a real-time Internet facsimile apparatus is shown to which a communication connecting device embodying the present invention is applied. Part of the facsimile apparatus not relevant to the present invention is neither shown in FIG. 1 nor will be described specifically. Signals are designated by reference numerals attached to signal lines on which they appear. As shown, the real-time Internet facsimile apparatus (RT FAX hereinafter), generally 10, includes a scanner 12, a data storage 14, a packetizer 16, a size information storage 18, a rate control circuit 20, and a LAN (Local Area Network) controller 22.

Figure 2:
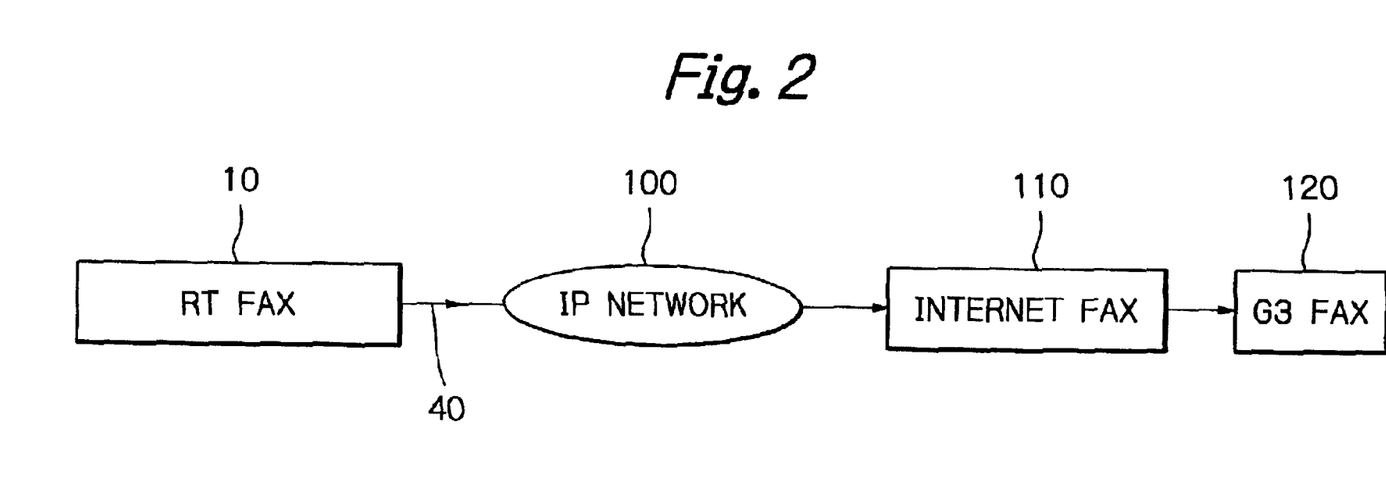
FIG. 2 is a schematic block diagram showing a specific communication system in which the facsimile apparatus of FIG. 1 and a G3 facsimile apparatus are interconnected as a sending terminal and a receiving terminal, respectively, via an IP network.

As shown in FIG. 2, the RT FAX 10 is connected to an Internet FAX 110 via an IP network 100. The Internet FAX 110 is connected to a G3 FAX 120 via a PSTN (Public Switched Telephone Network) not shown. As FIG. 2 indicates, the RT FAX 10, IP network 100 and Internet FAX 110 constitute a communication domain to which the protocol defined by Recommendation T.38 (June/1998) is assigned. On the other hand, the protocol defined by Recommendation T.30 (revised in 1996) is assigned to the PSTN connecting the Internet FAX 110 and G3 FAX 120.

Assume that the RT FAX 10 and G3 FAX 120 are a sending terminal and a receiving terminal, respectively. Then, the illustrative embodiment pertains to a procedure for causing the RT FAX 10 to operate with the Recommendation T.38 protocol (June/1998) and causing the IP network 100 to operate at the communication rate of the Recommendation T.30 protocol (revised in 1996).

Referring again to FIG. 1, in the RT FAX 10, the scanner 12 transforms data read out of a document to a corresponding electric signal. Specifically, the operator of the RT FAX 10 lays documents, which are paper sheets or similar recording media, on a tray, not shown, mounted on the RT FAX 10. The operator then inputs a read-out command on an operation panel, not shown, also mounted on the RT FAX 10. In response, the scanner 12 starts scanning the documents with light. The scanner senses the intensity of reflection from part of each document where data is present and the intensity of reflection from the other part of the same and transforms each of them to a corresponding electric signal. The scanner 12 digitizes the electric signal and outputs the resulting digital signal or data 24 having tonality.

The data 24 output from the scanner 12 are written to the data storage 14 in accordance with a control signal 26 fed from a system controller not shown. The data storage 14 may preferably be implemented by a non-destructive memory, so that the data 24 can be repeatedly read out of the storage 14. Subsequently, the data 24 are read out of the data storage 14 also in accordance with the control signal 26 and input to the packetizer 16 as data 28.

The size information storage 18 stores a packet size meant for packets to be derived from the data 28 and provides the packetizer 16 with the packet size beforehand. The packetizer 16 divides the input data 28 into packets having the above packet size each and feeds the packets to the rate control circuit 20 one by one.

The rate control circuit 20 is made up of a timer 20a, a rate calculator 20b, a transmission controller 20c, and a packet size controller 20d. The timer 20a is implemented by a packet counter incrementing every time a single packet is sent and a time counter incrementing every time a preselected unit time expires. While the timer 20a is counting the packets 34 and time, the packets 34 are continuously fed from the rate control circuit 20 to the LAN controller 22. When the time counter, for example, reaches a preselected count, the packet counter stops counting the packets 34. At this instant, the timer 20a delivers the count of the time counter and that of the packet counter, generally labeled 34a, to the rate calculator 20b.

The rate calculator 20b is informed of the unit time assigned to the time counter and the packet size beforehand. The rate calculator 20b multiplies the count of the time counter and the count of the packet counter by the unit time and packet size, respectively, thereby calculating the duration of measurement and the amount of data sent. The rate calculator 20b then divides the amount of data sent by the duration of measurement to thereby determine a communication rate for a second. The calculated communication rate, labeled 34b, is input to the transmission controller 20c.

The transmission controller 20c compares the input communication rate 34b with a communication rate represented by a DCS signal. In the illustrative embodiment, the DCS signal output from the RT FAX or sending terminal 10 includes a communication rate signal that causes the G3 FAX or receiving terminal 120 to operate in accordance with the protocol defined by the Recommendation T.30 protocol. How the RT FAX 10 determines the DSC signal will be described later in detail.

The transmission controller 20c feeds a packet request bit 36, which selectively takes a high level or a low level, to the packetizer 16. So long as the calculated communication rate 34b is lower than the communication rate indicated by the DCS signal, the transmission controller 20c maintains the packet request bit 36 at a high level. If the former is higher than the latter, then the transmission controller 20c causes the packet request bit 36 to go low for thereby inhibiting the packetizer 16 from outputting the packets. At the same time, the transmission controller 20c feeds a packet size control signal 34c to the packet size controller 20d.

In response to the packet size control signal 34c, the packet size controller 20d delivers a packet size signal 38 to the size information storage 18, causing the storage 18 to reduce the packet size. As a result, the amount of data of the individual packet decreases. Consequently, the communication rate of, e.g., 100 Mbps or 10 Mbps decreases to the communication rate particular to the G3 FAX 120 stepwise.

The LAN controller 22 not only converts the input data 34 to an analog signal, but also monitors conflicts. In addition, the LAN controller 22 plays the role of an interface for matching the level of the electric signal to the protocol of the IP network 100. The LAN controller 22 sends packets 40 to the IP network 100 while arbitrating the communication rate output from the RT FAX 10 and that of the G3 FAX 120.

Figure 3:
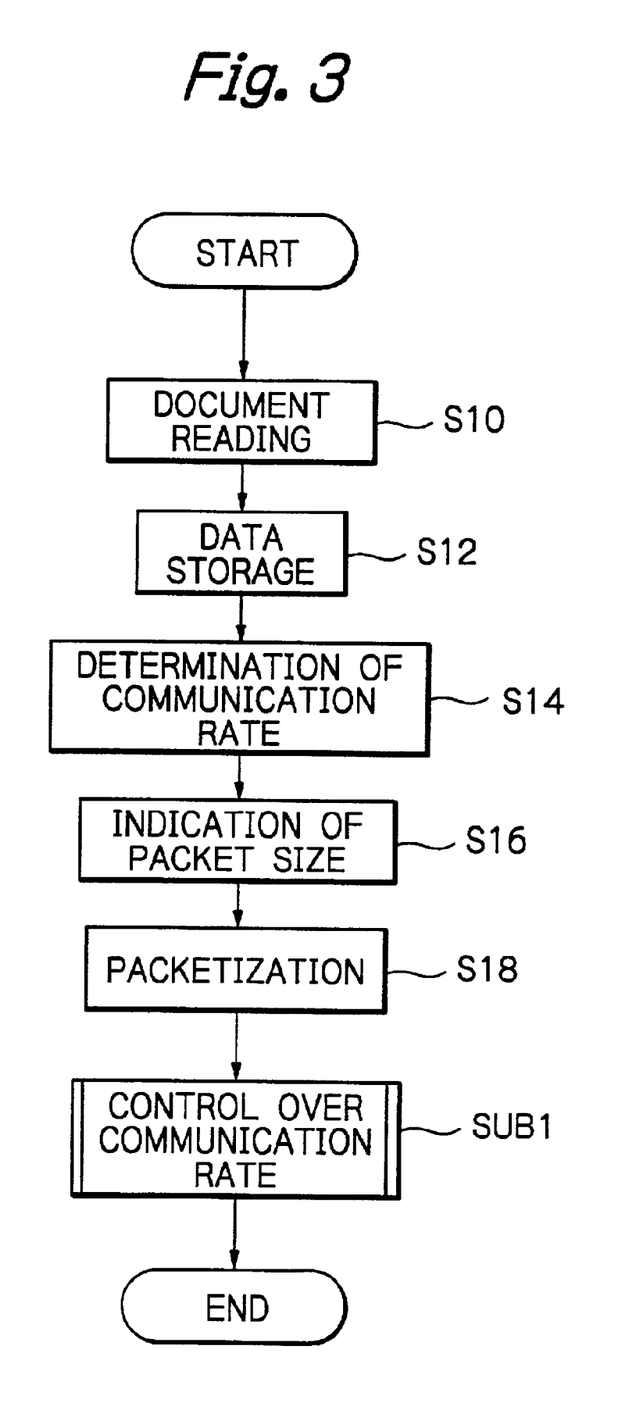
FIG. 3 is a flowchart demonstrating a specific main routine for connection control available with the illustrative embodiment.

Reference will be made to FIG. 3 for describing control over the connection of the RT FAX 10. In the RT FAX 10, the scanner 12 scans documents stacked on a tray, not shown, one by one and transforms the resulting imagewise reflection incident to an image sensor, not shown, to an electric signal. The scanner 12 then digitizes the electric signal to thereby output digital data 24 (step S10). The digital data 24 are input to the data storage 14 (step S12). It is to be noted that the RT FAX 10 is capable of dealing even with data input thereto from an external terminal connected thereto.

Subsequently, the RT FAX 10 determines a communication rate (step S14). Specifically, the RT FAX 10 first sends a CNG signal to the G3 FAX 120. In response, the G3 FAX 120 returns a CED signal for the identification of a receiving terminal to the RT FAX 10 together with a DIS signal. The RT FAX 10 recognizes the settings of the G3 FAX 120, which include a communication rate, on the basis of the CED signal and DIS signal. The RT FAX 10 determines a communication rate by comparing the communication rate available with the G3 FAX 120 and the communication rate particular to the Recommendation T.30 protocol.

After the step S14, the size information storage 18 delivers packet size information 30 to the packetizer 16 (step S16). The packetizer 16 divides the data 28 read out of the data storage 14 into packets 32 in accordance with the packet size information 30 (step S18). The packetized data 32 are fed from the packetizer 16 to the rate control circuit 20.

The rate control circuit 20 feeds the packetized data 32 to the LAN controller 22 in the form of packets 34 while measuring the communication rate of the IP network 100. The rate control circuit 20 controls, based on the measured communication rate, the communication rate such that the G3 FAX 120 can receive the packets 34 (subroutine SUBL). Usually, a communication rate available with the RT FAX 10 is limited to 100 Mbps or 10 Mbps assigned to the IP network 100 in accordance with the Recommendation T.38 protocol. However, the above control allows the RT FAX 10 to communicate even with the G3 FAX 120 at the communication rate assigned to the G3 FAX 120 in accordance with the Recommendation T.30 protocol.

Figure 4:
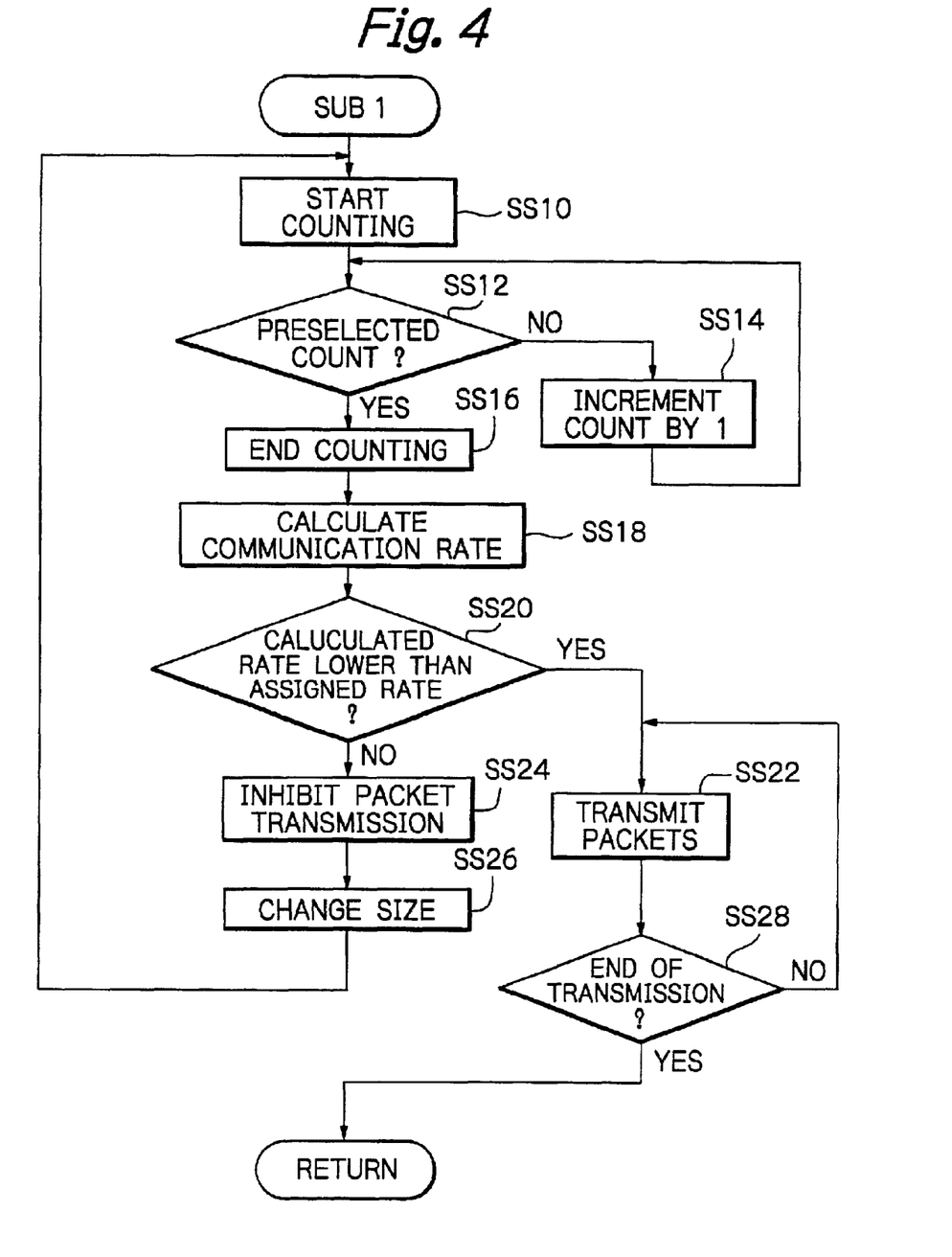
FIG. 4 is a flowchart showing a subroutine included in the main routine of FIG. 3 in detail.

The subroutine SUB1 will be described more specifically with reference to FIG. 4. At the beginning of the subroutine SUB1 or when the packet size is varied, the packet counter of the timer 20a is reset to "1". As shown in FIG. 4, on the start of transmission of the packets 34, the time counter of the timer 20a starts counting time (substep SS10). At the same time, the packet counter starts counting the packets 34, although not shown specifically.

After the substep SS10, whether or not the time counter has reached a preselected count is determined (substep SS12). If the answer of the substep SS12 is negative (NO), then the time counter is incremented by 1 (substep SS14). At this stage, the packet counter is still counting the packets 34 being sent. When the time counter reaches the preselected count (YES, substep SS12), then it stops counting time (substep SS16). At the same time, the packet counter stops counting the packets 34. The time and the number of packets counted are fed from the timer 20a to the rate calculator 20b.

The rate calculator 20b calculates the actual communication rate of the IP network 100 by using the time and the number of packets counted (substep SS18). Specifically, the rate calculator 20b multiplies the preselected time counting period by the count of the time counter to thereby determine a period of time. Also, the rate calculator 20b multiplies the count of the packet counter by the packet size information 30 to thereby produce an amount of data sent. Subsequently, the rate calculator 20b divides the calculated amount of data by the calculated period of time for thereby producing an amount of data sent for a unit period of time. This amount of data is representative of the mean communication rate of the IP network 100. The communication rate determined by the rate calculator 20b is input to the transmission controller 20c.

The transmission controller 20c determines whether or not the calculated communication rate is lower than the assigned communication rate (substep SS20). If the calculated communication rate is lower than the assigned communication rate (YES, substep SS20), then the transmission controller 20c determines that the G3 FAX 120 is ready to receive packets at the calculated communication rate, and sends the packets (substep SS22). Subsequently, the transmission controller 20c causes the packet request bit fed to the packetizer 16 to go high. If the answer of the substep SS20 is NO, then the transmission controller 20c determines that the G3 FAX 120 cannot receive packets at the communication rate, and inhibits the transmission of the packets (substep SS24). In this case, the transmission controller 20c causes the packet request bit to go low and feeds a control signal 34c to the packet size controller 20d.

In response to the control signal 34c, the packet size controller 20d delivers a packet size change signal 38 to the size information storage 18 (substep SS26). The size information storage 18 reduces the packet size information 30 in accordance with the packet size change signal 28. Subsequently, the operation returns to the step SS10 in order to again read the data 24 out of the data storage 14, packetize the data, and repeat the procedure described above. Consequently, the communication rate is lowered stepwise until the answer of the step SS20 changes from NO to YES.

After the start of transmission of the packets, whether or not all the packets have been sent is determined (substep SS28). If the answer of the substep SS28 is NO, meaning that other data to be sent exist, then the step SS22 is repeated. If the answer of the step SS28 is YES, then the subroutine SUB1 ends.

Assume that the communication rate of the IP network 100 varies. Then, the position of data sent when a preselected period of time has elapsed is memorized. In this case, the data immediately following the above data and successive data are sequentially read out of the data storage 14. This is followed by the substeps SS10 through SS20.

While the illustrative embodiment is constructed to count a preselected period of time with the time counter, it may count a period of time up to the time when the packets reaches a preselected number, if desired.

Now, intervals for distinguishing consecutive packets exist between the packets. Because such intervals do not contribute to transmission at all, only the periods of time during which packets are actually sent may be counted in order to determine an amount of data and therefor a communicate rate. This control procedure produces a communication rate on the basis of data actually sent. In this case, it is preferable to count only the duration of substantial packet transmission in place of the period of time having a preselected period. Such periods of time are added until a preselected number of packets have been fully sent.

As for comparison, the above alternative procedure uses the same rule as the previously stated procedure. In the alternative procedure, the total period of time counted is shorter than in the previous procedure although the amount of data sent is the same. As a result, a communication rate derived from the period of time counted is higher than the mean communication rate stated earlier. However, the resulting communication rate must be lower than the assigned communication rate. The decision on the communication rate is therefore more strict than in the previous procedure. If the result of the decision is positive, then accurate real-time communication can be surely held between the RT FAX 10 and the G3 FAX 120.

Figure 5:
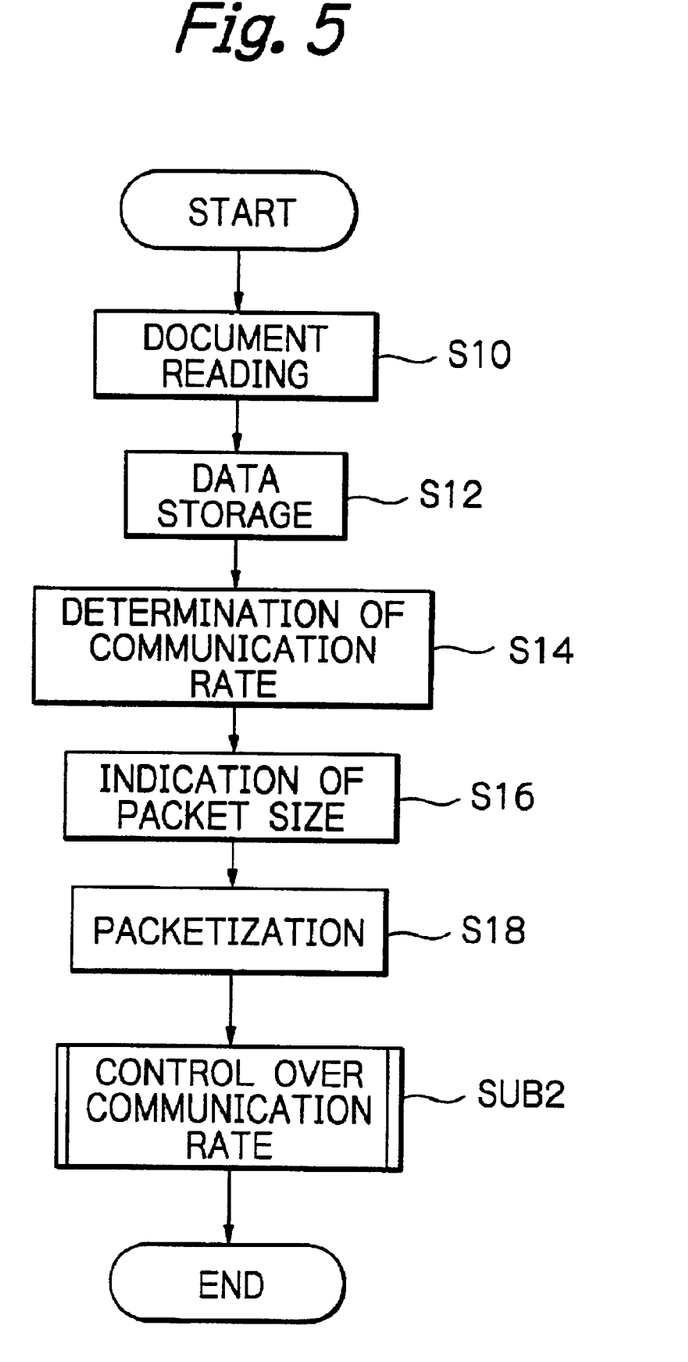
FIG. 5 is a flowchart representative of another specific main routine available with the illustrative embodiment.
Figure 6:
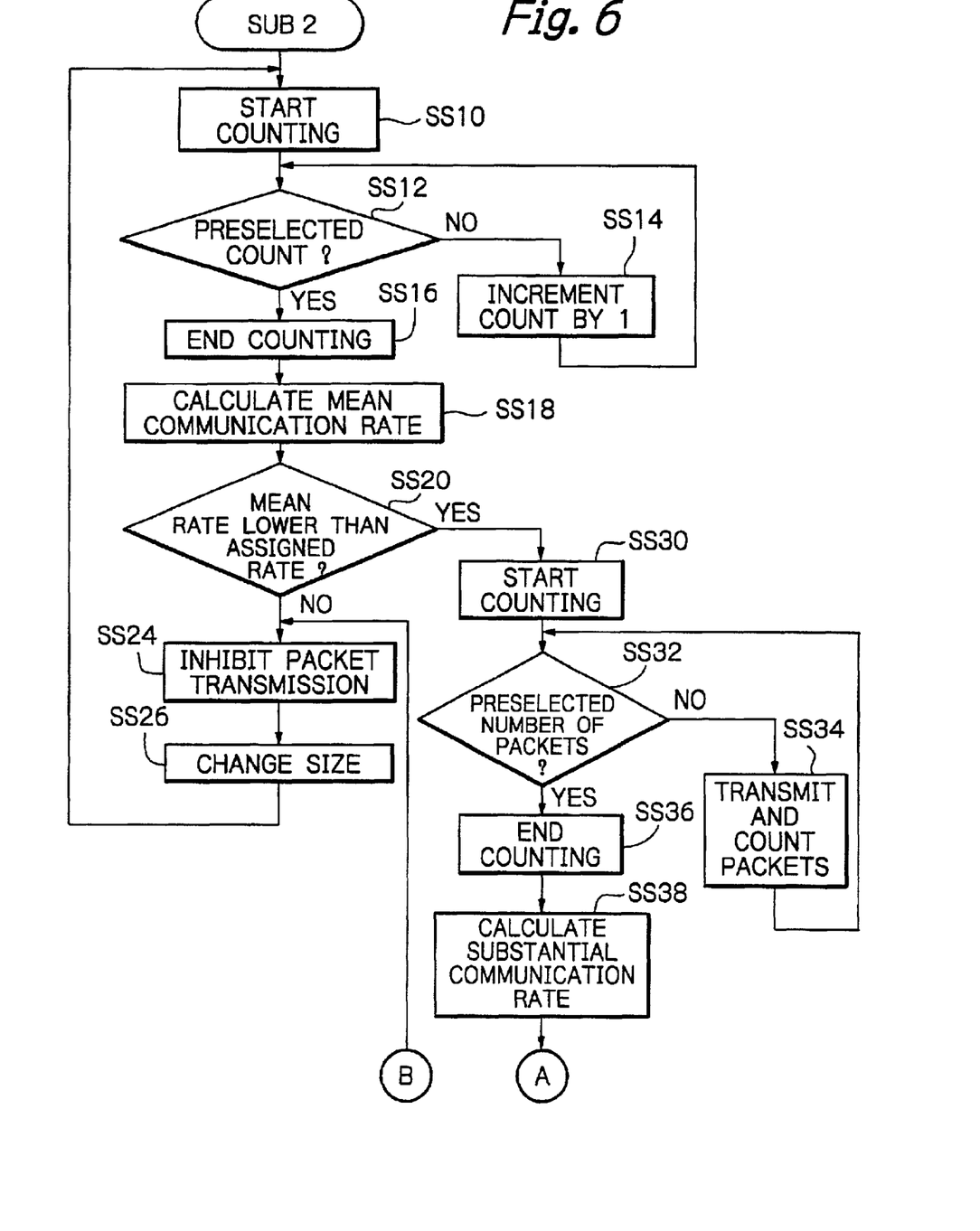
FIG. 6 is a flowchart showing a subroutine included in the main routine of FIG. 5 in detail.

FIG. 5 demonstrates another specific operation of the illustrative embodiment that controls the communication rate by taking account of both of the mean communication rate and substantial communication rate. The main routine shown in FIG. 5 is identical with the main routine of FIG. 3 except for a subroutine SUB2, which is a substitute for the subroutine SUB1. FIG. 6 shows the subroutine SUB2 in detail. In FIG. 6, steps SS10 through SS20 are identical with the steps SS10 through SS20 of FIG. 4 and will not be described specifically in order to avoid redundancy.

As shown in FIG. 6, if the mean communication rate is lower than the assigned communication rate (YES, substep SS20) then the communication rate of the packet transmission is measured again (substep SS30). Specifically, the time counter of the timer 20a counts and adds only the substantial periods of time of transmission other than the intervals between consecutive packets. At the same time, the packet counter of the timer 20a is reset to zero and then caused to start counting packets.

Whether or not the number of packets counted in the substep SS30 is equal to a preselected value is determined (substep SS32). If the answer of the step SS32 is NO, then the next packet is sent while the packet counter is incremented by 1 (substep SS34). The step SS34 is followed by the step SS32. If the answer of the step SS32 is YES, then the measurement ends (substep SS36). Thereafter, the preselected number of packets and the total period of time counted are fed to the rate calculator 20b.

The rate calculator 20b multiplies the preselected number of packets by the packet size information 30 to thereby produce an amount of data sent. The rate calculator 20b then divides the amount of data by the total period of time for thereby producing a substantial communication rate (substep SS38). Subsequently, the operation is transferred to a substep SS40 shown in FIG. 7, as indicated by letter A.

Figure 7:
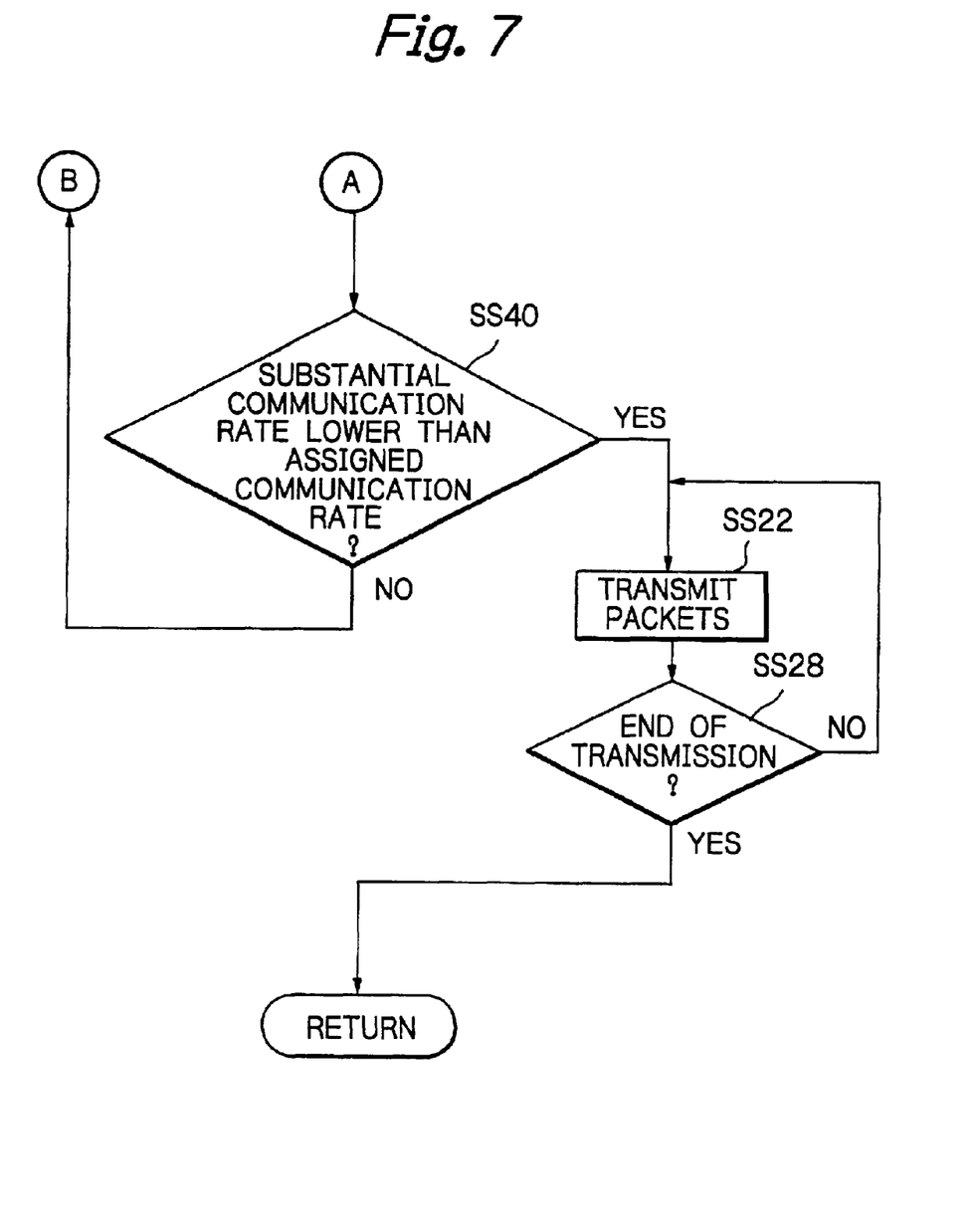
FIG. 7 is a flowchart showing a sequence of steps following the procedure of FIG. 6.

In the substep SS40, the transmission controller 20c determines whether or not the substantial communication rate is lower than the assigned communication rate. If the answer of the step SS40 is YES, then the communication controller 20c determines that the G3 FAX 120 is capable of receiving packets at the above communication rate, and continues the transmission of the packets (substep SS22). If the answer of the substep SS40 is NO, then the communication controller 20c determines that the G3 FAX 120 is not adaptive to the communication rate. This is followed by a substep SS24 shown in FIG. 6, as indicated by letter B.

In the substep SS24, the transmission controller 20c inhibits the packets from being sent to the G3 FAX 120. At the same time, the transmission controller 20c feeds a packet size control signal 34c to the packet size controller 20d. In response, the packet size controller 20d delivers a packet size change signal 38 to the size information storage 18 (substep SS26), causing the storage 18 to reduce the packet size information 30. Thereafter, the substep SS10 and successive substeps are repeated to again read the data 24 out of the data storage 14 and packetize them. By such a procedure, the communication rate is lowered stepwise.

It is preferable to set a flag if the answer of the step SS40, FIG. 7, is YES, although not shown specifically. If the flag is set when the packet size is varied, then the operation may be transferred to the substep SS30.

While the packets are sent at the communication rate matching with the G3 FAX 120 in the step SS22, the transmission controller 20c determines whether or not all the packets have been sent (substep SS28). If the answer of the substep SS28 is NO, then the transmission controller 20c causes the packet request bit fed to the packetizer 16 to go high, urging the packetizer 15 to send the remaining packets. If the answer of the step SS28 is YES, the subroutine SUB2 ends.

As stated above, the specific procedure shown in FIGS. 5 and 6 determines whether or not packets can be set at the mean communication rate. Further, the procedure counts a substantial period of time other than intervals between consecutive packets, compares communication rates, and then sends packets at the communication rate matching with the Recommendation T.30 protocol. This further promotes accurate real-time communication between the RT FAX 10 and G3 FAX 120. This procedure, like the previously stated procedure, should preferably monitor the communication rate of the IP network at preselected intervals.

While the illustrative embodiment has concentrated on a facsimile apparatus, the present invention is applicable to any other communication apparatus. The control over the communication rate can, of course, be implemented by software without resorting to any extra hardware.

In summary, it will be seen that the present invention provides a communication connecting device and a communication rate control method therefor capable of insuring accurate communication without any loss of data.

The entire disclosure of Japanese patent application No. 2000-258134 filed on Aug. 23, 2000, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A communication connecting device, which includes a function of a sending communication terminal directly connected to an IP (Internet Protocol) network, for controlling a communication rate of data to send to a receiving communication terminal via said IP network, said device comprising:

a data storage for storing the data to be sent;

a packetizer for dividing the data read out of said data storage into packets having a preselected size each;

a size information storage storing information representative of the preselected size for providing said packetizer with said information;

a rate control circuit for counting a preselected period of time after a start of transmission of the packets or a period of time up to a time when a preselected number of packets are fully sent, calculating a communication rate on the basis of said period of time, comparing said communication rate with a communication rate determined in accordance with a protocol assigned to the receiving communication terminal, and controlling said packetizer in accordance with a result of comparison; and an interface connected to the IP network for sending the packets while adjusting said packets.

2. The device in accordance with claim 1, wherein said rate control circuit comprises:

a timer for counting a period of time between the start of transmission of the data and an end of transmission;

a rate calculator for calculating a communication rate for a unit time by using an amount of data sent during counting of the period of time and said period of time;

a transmission controller for comparing the communication rate output from said rate calculator and the communication rate matching with the preselected protocol of the receiving communication terminal, and selectively allowing or inhibiting transmission of the packets in accordance with the result of comparison; and an information controller for controlling the information to be read out of said data storage.

3. The device in accordance with claim 2, wherein said rate calculator calculates at least one of a mean communication rate for the unit time by using the amount of data sent during counting and the period of time counted, and a substantial communication rate for the unit time by the amount of data sent up to the end of transmission and a period of time produced by subtracting intervals between consecutive packets from said period of time.

4. A communication rate control method for a communication connecting device, which includes a function of a sending communication terminal directly connected to an IP network, for controlling a communication rate of data to send to a receiving communication terminal via said IP network, said method comprising the steps of:

causing the communication connecting device to send, at a preparatory stage for data transmission, a first signal to the receiving communication terminal, receive an answer signal output from said receiving communication terminal in response to said first signal, determine a communication rate on the basis of a communication rate, which is included in said answer signal, and a communication rate defined by a protocol assigned to said receiving communication terminal, and send a second signal including said communication rate determined to said receiving communication terminal;

providing packet size information for dividing data into packets having a preselected size each;

reading out the data and then packetizing said data on the basis of the packet size information; and counting a preselected period of time after a start of transmission of the packets or a period of time up to a time when a preselected number of packets are fully sent, calculating a communication rate of the IP network by using said period of time, the preselected number of packets and the preselected packet size, and inhibiting, if said communication rate of said IP network is higher than the communication rate included in the second signal, the transmission of the packets or generating, if said communication rate of said IP network is lower than said communication rate included in said second signal, a packet send request while executing control for the transmission of the packets.

5. A communication rate control method for a communication connecting device, which includes a function of a sending communication terminal directly connected to an IP network, for controlling a communication rate of data to send to a receiving communication terminal via said IP network, said method comprising:

a first step of causing the communication connecting device to send, at a preparatory stage for data transmission, a first signal to the receiving communication terminal, receive an answer signal output from said receiving communication terminal in response to said first signal, determine a communication rate on the basis of a communication rate, which is included in said answer signal, and a communication rate defined by a protocol assigned to said receiving communication terminal, and send a signal including said communication rate determined to said receiving communication terminal;

a second step of providing packet size information for dividing data into packets having a reselected size each;

a third step of reading out the data and then packetizing said data on the basis of the packet size information; and a fourth step of counting a preselected period of time after a start of transmission of the packets or a period of time up to a time when a preselected number of packets are fully sent, and calculating a communication rate of the IP network by using the preselected number of packets, the preselected packet size and a substantial period of time contained in said period of time and produced by subtracting intervals between consecutive packets from said period of time; and a fifth step of generating, if said communication rate of said IP network is lower than said communication rate included in said second signal, a packet send request and causing the packets to be sent.

6. The method in accordance with claim 5, wherein said fifth step includes a sixth step of inhibiting, if the communication rate of the IP network is higher than the communication rate included in the second signal, transmission of the packets while causing at least one of the preselected number of packets and the preselected packet size to decrease stepwise, said second step to said fifth step being repeated after said sixth step.

7. A communication rate control method for a communication connecting device, which includes a function of a sending communication terminal directly connected to an IP network, for controlling a communication rate of data to send to a receiving communication terminal via said IP network, said method comprising:

a first step of causing the communication connecting device to send, at a preparatory stage for data transmission, a first signal to the receiving communication terminal, receive an answer signal output from said receiving communication terminal in response to said first signal, determine a communication rate on the basis of a communication rate, which is included in said answer signal, and a communication rate defined by a protocol assigned to said receiving communication terminal, and send a second signal including said communication rate determined to said receiving communication terminal;

a second step of providing packet size information for dividing data into packets having a preselected size each;

a third step of reading out the data and then packetizing said data on the basis of the packet size information;

a fourth step of counting a preselected period of time after a start of transmission of the packets or a period of time up to a time when a preselected number of packets are fully sent, and calculating a first communication rate of the IP network by using said period of time, the preselected number of packets and the preselected packet size;

a fifth step of inhibiting transmission of the packets if the second communication rate is higher than the communication rate included in the second signal;

a sixth step of calculating a second communication rate of the IP network by using a period of time produced by subtracting intervals between consecutive packets from the period of time counted; and a seventh step of generating, if either one of the first communication rate and the second communication rate is lower than the communication rate included in said second signal, a packet send request and causing the packets to be sent.

8. The method in accordance with claim 7, wherein said seventh step includes an eighth step of inhibiting, if the second communication rate of the IP network is higher than the communication rate included in the second signal, transmission of the packets while causing at least one of the preselected number of packets and the preselected packet size to decrease stepwise, said second step to said seventh step being repeated after said eighth step.

9. The method in accordance with claim 7, wherein said fourth step is repeated at preselected intervals for thereby monitoring the communication rate of the IP network.

* * * * *